US012563566B2

(12) United States Patent
Xie et al.

(10) Patent No.: US 12,563,566 B2
(45) Date of Patent: Feb. 24, 2026

(54) COMMUNICATION METHOD AND APPARATUS

(71) Applicant: HUAWEI TECHNOLOGIES CO., LTD., Shenzhen (CN)

(72) Inventors: Xinqian Xie, Beijing (CN); Zhiheng Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 18/342,903

(22) Filed: Jun. 28, 2023

(65) Prior Publication Data

US 2023/0345500 A1     Oct. 26, 2023

Related U.S. Application Data

(63) Continuation of application No. PCT/CN2020/140908, filed on Dec. 29, 2020.

(51) Int. Cl.
| | |
|---|---|
| *H04W 72/23* | (2023.01) |
| *H04W 72/0446* | (2023.01) |
| *H04W 72/0453* | (2023.01) |
| *H04W 72/1263* | (2023.01) |

(52) U.S. Cl.
CPC ....... *H04W 72/23* (2023.01); *H04W 72/0446* (2013.01); *H04W 72/0453* (2013.01); *H04W 72/1263* (2013.01)

(58) Field of Classification Search
CPC ............. H04W 72/23; H04W 72/0446; H04W 72/0453; H04W 72/1263; H04L 5/0053; H04L 5/0094
See application file for complete search history.

(56) References Cited

U.S. PATENT DOCUMENTS

| | | | | |
|---|---|---|---|---|
| 2014/0286299 A1* | 9/2014 | Ihm | ....................... | H04L 5/0053 370/329 |
| 2019/0053212 A1* | 2/2019 | Liu | ....................... | H04L 5/0091 |
| 2020/0037351 A1* | 1/2020 | Tang | ..................... | H04L 5/0053 |
| 2020/0128528 A1* | 4/2020 | Tang | ..................... | H04W 72/04 |

FOREIGN PATENT DOCUMENTS

| | | |
|---|---|---|
| CN | 107948988 A | 4/2018 |
| CN | 109392120 A | 2/2019 |
| CN | 110495119 A | 11/2019 |
| CN | 110741700 A | 1/2020 |

OTHER PUBLICATIONS

International Search Report and Written Opinion issued in PCT/CN2020/140908, dated Sep. 28, 2021, 9 pages.
Extended European Search Report issued in European Application No. 20967416.7 dated Dec. 19, 2023.

* cited by examiner

*Primary Examiner* — Dady Chery

(57)     ABSTRACT

To resolve a problem of high signaling overheads caused by resource scheduling in a scenario in which a channel slowly varies, a terminal device receives first signaling, where the first signaling includes first indication information of first information associated with a first signal and first indication information of first information associated with a second signal. The terminal device receives second signaling, where the second signaling indicates the terminal device to receive the second signal in a second time unit, and does not include indication information of the first information associated with the second signal.

19 Claims, 5 Drawing Sheets

Core network device 130     Radio access network device 120     Terminal device 110     Terminal device 140

DMRS port 0&1

DMRS port 2&3

DMRS port 4&5

Data information

Control information

PDCCH          DMRS          PDSCH

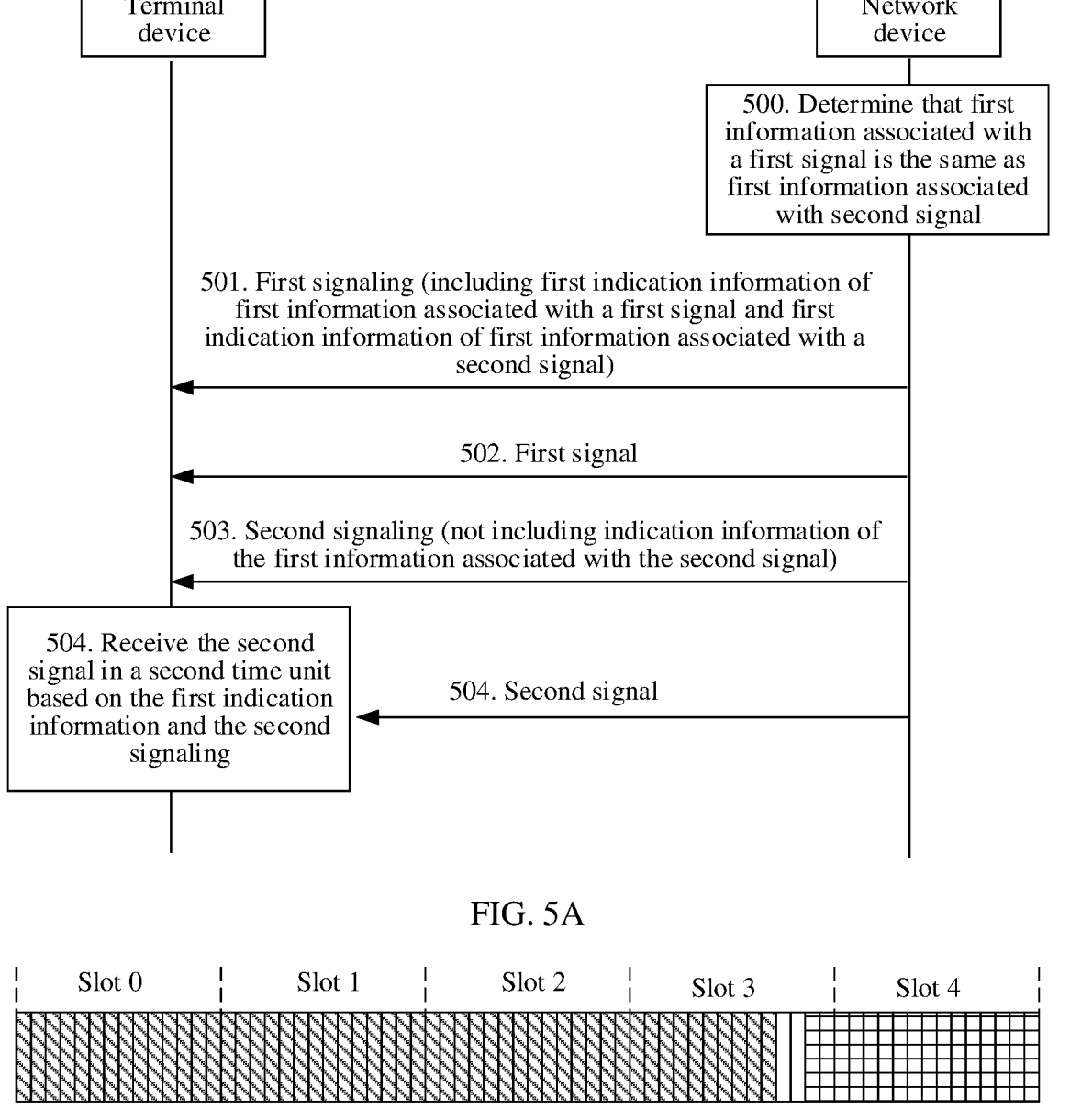

Terminal
device

Network
device

500. Determine that first
information associated with
a first signal is the same as
first information associated
with second signal 501. First signaling (including first indication information of
first information associated with a first signal and first
indication information of first information associated with a
second signal)

502. First signal

503. Second signaling (not including indication information of
the first information associated with the second signal)

504. Receive the second
signal in a second time unit
based on the first indication
information and the second
signaling 504. Second signal

FIG. 5A

| Slot 0 | Slot 1 | Slot 2 | Slot 3 | Slot 4 |
|---|---|---|---|---|

⬚ Downlink symbol      ⬚ Uplink symbol

FIG. 6

COMMUNICATION METHOD AND APPARATUS

CROSS-REFERENCE TO RELATED APPLICATIONS

This application is a continuation of International Application No. PCT/CN2020/140908, filed on Dec. 29, 2020, the disclosure of which is hereby incorporated by reference in its entirety.

TECHNICAL FIELD

Embodiments relate to the wireless communication field, and in particular, to a communication method and an apparatus.

BACKGROUND

In a $5^{th}$ generation mobile communication technology ("the 5th generation", or "5G") new radio interface ("NR") system and a long term evolution ("LTE") system, a network device sends downlink control information ("DCI") to a terminal device in each slot, to indicate the terminal device to receive a physical downlink shared channel ("PDSCH") in a plurality of consecutive slots. Each piece of DCI includes indication fields indicating a frequency domain position and an antenna port corresponding to a PDSCH.

For a terminal device with a slowly-varying channel, when the terminal device needs to receive the PDSCH in the plurality of consecutive slots, the network device sends the DCI to the terminal in each slot, to schedule the PDSCH. In addition, the DCI in each slot carries a frequency domain resource indication field and an antenna port indication field to indicate the same content, thereby increasing unnecessary signaling overhead.

SUMMARY

Embodiments herein provide a communication method and a device, to reduce signaling overhead.

According to a first aspect, a communication method is provided. The method may be executed by a terminal device, or may be executed by a chip used in a terminal device. The following provides descriptions by taking an example in which the method is executed by a terminal device. The terminal device may receive first signaling from a network device, where the first signaling indicates the terminal device to receive a first signal in a first time unit, and includes first indication information of first information associated with the first signal and first indication information of first information associated with a second signal. The terminal device may receive the first signal in the first time unit based on the first signaling. The terminal device receives second signaling, where the second signaling indicates the terminal device to receive the second signal in a second time unit, and does not include indication information of the first information associated with the second signal. The terminal device may receive the second signal in the second time unit based on the first indication information and the second signaling, where the first information includes at least one of the following: frequency domain resource information, modulation and coding scheme information, antenna port information, and/or bandwidth information.

In the foregoing implementation, the second signaling does not need to carry the indication information indicating the first information associated with the second signal. This reduces overhead of the indication information carried in the second signaling, and improves communication efficiency. Further, for a terminal device with a slowly-varying channel, channel quality of the network device and the terminal device remains almost unchanged in a plurality of consecutive slots. In this way, the network device sends a signal to the terminal device in the plurality of consecutive slots using one or more of the following: a same frequency domain resource, a same modulation and coding scheme, a same antenna port, and/or a same bandwidth. In this way, there is no adverse impact on transmission performance, and therefore overhead for sending the second signaling is reduced without reducing communication quality.

In a possible design, that the terminal device may receive the second signal in the second time unit based on the first indication information and the second signaling includes: The terminal device may determine the first information associated with the second signal based on the first indication information, and receive the second signal in the second time unit based on the first information and the second signaling. In the foregoing implementation, the terminal device may determine the first information corresponding to the second signal, so that the terminal device can correctly receive the second signal. In this way, overhead for sending the second signaling can be reduced without reducing the communication quality.

In a possible design, the indication information of the first information includes frequency domain resource indication information and antenna port indication information. The terminal device separately determines a frequency domain resource occupied by the second signal and an antenna port number corresponding to the frequency domain resource based on the frequency domain resource indication information and the antenna port indication information, and receives the second signal in the second time unit based on the frequency domain resource occupied by the second signal, the antenna port number corresponding to the frequency domain resource, and the second signaling. In the foregoing implementation, the terminal device may determine the frequency domain resource and the antenna port number that are corresponding to the second signal, so that the terminal device can correctly receive the second signal. In this way, overhead for sending the second signaling can be reduced without reducing the communication quality.

In a possible design, both the first time unit and the second time unit include one or more slots, mini-slots, or symbols. For example, the first time unit and the second time unit are each a time slot, and the first time unit and the second time unit do not overlap in time. In the foregoing implementation, the first signal and the second signal do not interfere with each other in time domain, allowing the terminal device to correctly receive the first signal and the second signal. In this way, overhead for sending the second signaling can be reduced without reducing communication quality.

In a possible design, the first time unit and the second time unit are corresponding to a same uplink-downlink switching periodicity. The uplink-downlink switching periodicity may be a period of time. In the switching periodicity, switching from a sending signal to a receiving signal can be performed only once. Therefore, the foregoing implementation can ensure that phases of the first signal and the second signal are continuous, allowing the terminal device to use a demodulation reference signal corresponding to the first signal to receive the second signal, thereby improving receiving performance of the second signal.

According to a second aspect, a communication method is provided. The method may be performed by a network device or a chip used in a network device. The following provides descriptions by taking an example in which the method is performed by a network device. For advantageous effects, refer to the first aspect. Details are not described herein again.

The network device may send first signaling to a terminal device, where the first signaling indicates the terminal device to receive a first signal in a first time unit, and includes first indication information of first information associated with the first signal and first indication information of first information associated with a second signal. The network device may send the first signal in the first time unit. The network device sends second signaling to the terminal device, where the second signaling indicates the terminal device to receive the second signal in a second time unit, and does not include indication information of first information associated with the second signal. The network device may send the second signal to the terminal device in the second time unit, where the first information includes at least one of the following: frequency domain resource information, modulation and coding scheme information, antenna port information, and bandwidth information.

In a possible design, before the network device sends the first signaling to the terminal device, the network device further needs to determine that the first information associated with the first signal is the same as the first information associated with the second signal.

In a possible design, both the first time unit and the second time unit include one or more slots, mini-slots, or symbols. For example, the first time unit and the second time unit are each a time slot, and the first time unit and the second time unit do not overlap in time. The first time unit and the second time unit are corresponding to a same uplink-downlink switching periodicity According to a third aspect, a communication apparatus is provided. For advantageous effects, refer to the descriptions in the first aspect. Details are not described herein again. The communication apparatus has functions of implementing the behavior in the method embodiments in the first aspect. The functions may be implemented by hardware, or may be implemented by hardware executing corresponding software. The hardware and/or the software includes one or more modules corresponding to the foregoing functions. In a possible design, the communication apparatus includes a storage module and a transceiver module. The storage module is configured to store a computer program or instructions. The transceiver module is configured to receive first signaling received from a network device, where the first signaling indicates a terminal device to receive a first signal in a first time unit, and includes first indication information of first information associated with the first signal and first indication information of first information associated with a second signal. The transceiver module is configured to receive the first signal in the first time unit based on the first signaling. The transceiver module is configured to receive second signaling, where the second signaling indicates the terminal device to receive a second signal in a second time unit, and does not include indication information of the first information associated with the second signal. The transceiver module receives the second signal in the second time unit based on the first indication information and the second signaling. The foregoing modules may perform corresponding functions in the method embodiments in the first aspect. For details, refer to the detailed descriptions in the method embodiments. Details are not described herein again.

According to a fourth aspect, a communication apparatus is provided. For advantageous effects, refer to the descriptions in the second aspect. Details are not described herein again. The communication apparatus has functions of implementing behavior in the method embodiments in the second aspect. The functions may be implemented by hardware, or may be implemented by hardware executing corresponding software. The hardware and/or the software includes one or more modules corresponding to the foregoing functions. In a possible design, the communication apparatus includes a storage module and a transceiver module. The storage module is configured to store a computer program or instructions. The transceiver module is configured to send first signaling to a terminal device, where the first signaling indicates the terminal device to receive a first signal in a first time unit, and includes first indication information of first information associated with the first signal and first indication information of first information associated with a second signal. The transceiver module is configured to send the first signal in the first time unit. The transceiver module is configured to send second signaling to the terminal device, where the second signaling indicates the terminal device to receive a second signal in the second time unit, and does not include indication information of first information associated with the second signal. The transceiver module is configured to send the second signal to the terminal device in the second time unit. The foregoing modules may perform corresponding functions in the method embodiments in the second aspect. For details, refer to the detailed descriptions in the method embodiments. Details are not described herein again.

According to a fifth aspect, a communication apparatus is provided. The communication apparatus may be a terminal device in the foregoing method embodiments or a chip disposed in a terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to execute the methods executed by the terminal device in the foregoing method embodiments.

According to a sixth aspect, a communication apparatus is provided. The communication apparatus may be a network device or a chip used in a network device in the foregoing method embodiments. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to execute the methods executed by the network device in the foregoing method embodiments.

According to a seventh aspect, a computer program product is provided. The computer program product includes computer program code. When the computer program code is run, the methods executed by the terminal device in the foregoing aspects are executed.

According to an eighth aspect, a computer program product is provided. The computer program product includes computer program code. When the computer program code is run, the methods executed by the network device in the foregoing aspects are executed.

According to a ninth aspect, a chip system is provided in this application. The chip system includes a processor, configured to implement functions of the terminal device in the methods of the foregoing aspects. In a possible design, the chip system further includes a memory, configured to store program instructions and/or data. The chip system may include a chip, or may include a chip and another discrete component.

According to a tenth aspect, a chip system is provided. The chip system includes a processor, configured to implement functions of the network device in the method of the foregoing aspects. In a possible design, the chip system further includes a memory, configured to store program instructions and/or data. The chip system may include a chip, or may include a chip and another discrete component.

According to an eleventh aspect, a computer readable storage medium is provided. The computer readable storage medium stores a computer program. When the computer program is run, the methods executed by the terminal device in the foregoing aspects are implemented.

According to a twelfth aspect, a computer readable storage medium is provided. The computer readable storage medium stores a computer program. When the computer program is run, the methods executed by the network device in the foregoing aspects are implemented.

BRIEF DESCRIPTION OF DRAWINGS

FIG. 5A is a schematic diagram of another possible communication method according to an embodiment;

FIG. 6 is a schematic diagram of a possible time unit according to an embodiment;

DESCRIPTION OF EXAMPLE EMBODIMENTS

Figure 1:
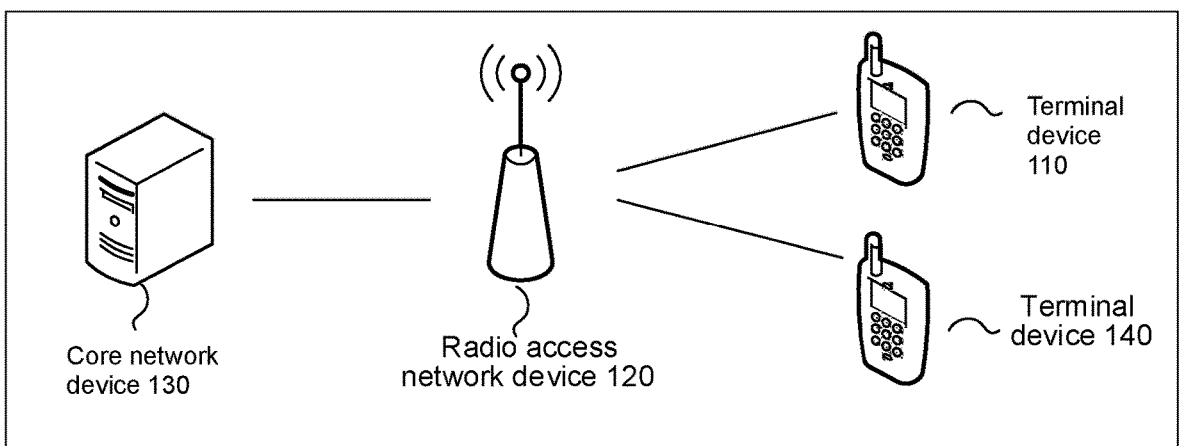
FIG. 1 is a schematic diagram of an architecture of a mobile communication system according to an embodiment.

FIG. 1 is a schematic diagram of an architecture of a mobile communication system applicable to an embodiment. The network architecture includes a terminal device 110 and an access network device 120. The terminal device 110 and the access network device 120 may communicate with each other through a Uu air interface. The Uu air interface may be understood as a universal UE to network interface. Transmission through the Uu air interface includes uplink transmission and downlink transmission.

For example, the uplink transmission is that the terminal device 110 sends uplink information to the access network device 120. The uplink information may include one or more of the following: uplink data information, uplink control information, and a reference signal (RS). A channel for transmitting uplink information is referred to as an uplink channel. The uplink channel may be a physical uplink shared channel (PUSCH) or a physical uplink control channel (PUCCH). The PUSCH is used to carry uplink data. The uplink data may also be referred to as the uplink data information. The PUCCH is used to carry uplink control information (UCI) fed back by the terminal device. The UCI may include channel state information (CSI), an acknowledgement (ACK)/a negative acknowledgement (NACK), and the like.

For example, the downlink transmission is that the access network device 120 sends downlink information to the terminal device 110. The downlink information may include one or more of the following: downlink data information, downlink control information, and a downlink reference signal. The downlink reference signal may be a channel state information reference signal (CSI-RS) or a phase tracking reference signal (PTRS). A channel for transmitting downlink information is referred to as a downlink channel. The downlink channel may be a physical downlink shared channel (PDSCH) or a physical downlink control channel (PDCCH). The PDCCH is used to carry downlink control information (DCI). The PDSCH is used to carry downlink data. The downlink data may also be referred to as the downlink data information.

Optionally, the network architecture shown in FIG. 1 may further include a core network device 130. The terminal device 110 may be connected to the access network device 120 in a wireless manner. The access network device 120 may be connected to the core network device 130 in a wired or wireless manner. The core network device 130 and the access network device 120 may be different independent physical devices, or the core network device 130 and the access network device 120 may be the same physical device. All/some logical functions of the core network device 130 and the access network device 120 are integrated into the physical device.

It should be noted that, in the network architecture shown in FIG. 1, the terminal device 110 may be at a fixed location or may be mobile. This is not limited in this application. The network architecture shown in FIG. 1 may further include other network devices, such as a wireless relay device and a wireless backhaul device. This is not limited in this application. In the architecture shown in FIG. 1, quantities of terminal devices, access network devices, and core network devices are not limited.

Technical solutions in embodiments may be applied to various communication systems, for example, a long term evolution (LTE) system, a 5th generation (5G) mobile communication system, and a future mobile communication system.

Based on the network architecture provided in FIG. 1, an orthogonal frequency division multiplexing access (OFDMA) mode is usually used for multiple access. A main characteristic of the orthogonal frequency division multiplexing access mode is dividing a transmission resource into mutually orthogonal time-frequency resource elements (REs). A signal is transmitted between the network device and the terminal device through REs. Because different REs are mutually orthogonal, the terminal device can separately receive the signal sent from each RE. In consideration of fading characteristics of a radio channel, a signal carried on the RE is distorted after being transmitted on the channel. The channel distortion is generally referred to as a channel coefficient. To recover the signal on the terminal device, a solution based on a reference signal is usually used to estimate a channel coefficient. To be specific, the network device transmits a known signal on a specific RE. The terminal device estimates the channel coefficient based on the received signal and the known signal, and performs interpolation on a channel coefficient on another RE based on the channel coefficient obtained by estimating, thereby facilitating receiving and demodulating the signal through the channel coefficient obtained by estimating.

Figure 2:
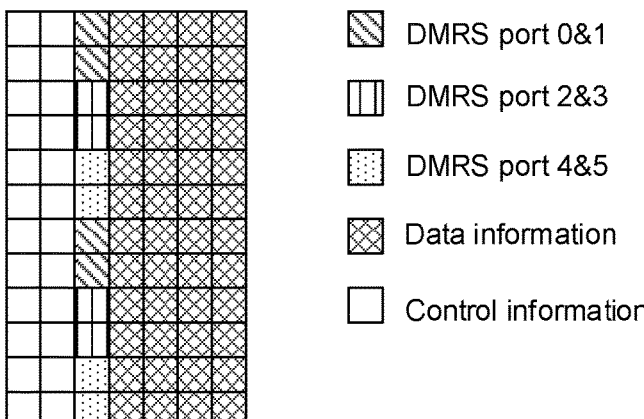
FIG. 2 is a schematic diagram of a possible resource according to an embodiment.

In an existing wireless communication system, a base station is equipped with a plurality of antennas for spatial multiplexing transmission using a multiple input multiple output (MIMO) technology. To be specific, a plurality of pieces of data are transmitted on a same time-frequency resource, and each piece of data is transmitted on an independent spatial layer. Each spatial layer is mapped to a different antenna port for sending. Considering that channel coefficients from different antenna ports to the terminal are different, in order to enable the terminal device to obtain information transmitted at a plurality of spatial layers, channel coefficients between each antenna port and the terminal are estimated. Therefore, different DMRSs are configured for each antenna port. The DMRSs corresponding to different antenna ports may be multiplexed in a mode such as time division, frequency division, and code division. For example, as shown in FIG. 2, a horizontal direction represents time domain, a vertical direction represents frequency domain, and each small block represents one RE. DMRS ports 0 and 1 are multiplexed by an orthogonal code. Therefore, REs corresponding to the two ports are also referred to as a code division multiplexing group (CDM group). In the example shown in the following figure, total quantities of DMRS ports are 6, and quantities of CDM groups are 3.

Figure 3:
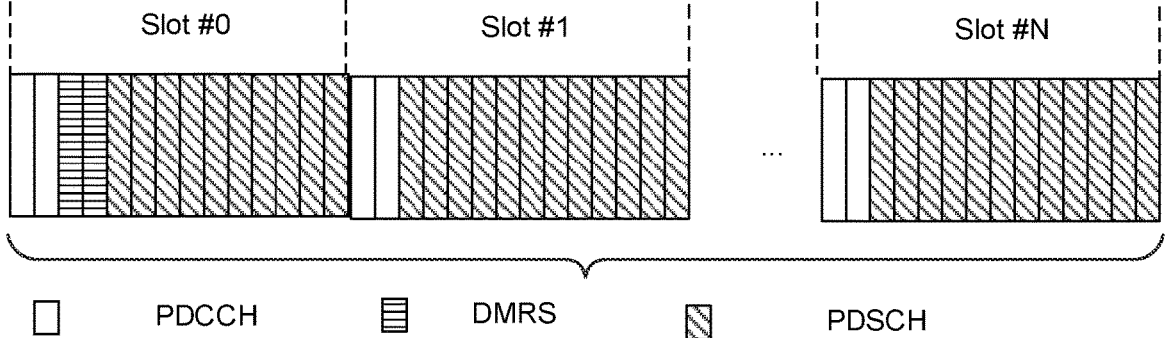
FIG. 3 is a schematic diagram of a possible DMRS port configuration according to an embodiment.

5G NR supports a fixed access node. The access nodes are usually mounted at fixed locations, such as a window and a roof. Once the access nodes are mounted, the locations of the access nodes do not change with time. Therefore, the speed of channel quality of the access nodes changing with time is lower than that of mobile phones. Generally, the fixed access node may be understood that channel states between the network device and the terminal device are approximately equal in N consecutive time units. In this case, a DMRS may not be configured to the M time units in the N time units, and data demodulation is performed in the M time units through a channel estimated by a DMRS in a pre-time unit, thereby reducing a pilot overhead. The time unit may be a slot. The M and the N are integers, where M<N. As shown in FIG. 3, two DMRS symbols are configured in a slot #0. No DMRS symbol is configured in a subsequent slot #1 to a subsequent slot #N.

In an application scenario in which a channel slowly varies, the network device sends the DCI to the terminal device in each time unit, to indicate the terminal device to receive the PDSCH from the network device in a plurality of consecutive time units. Each piece of DCI includes indication information used to indicate the frequency domain position, the antenna port, and the like, corresponding to the PDSCH. However, for a terminal device with a slowly-varying channel, when the terminal device needs to receive a PDSCH in the plurality of consecutive time units, the network device sends the DCI to the terminal in each time unit, to schedule the PDSCH. In addition, the DCI in each time unit carries a frequency domain resource indication field and an antenna port indication field to indicate same content, thereby increasing unnecessary signaling overhead.

Based on the foregoing description, this application provides a communication method. A principle of the method is as follows: First signaling received by a terminal device includes first indication information of first information associated with a first signal and first indication information of first information associated with a second signal, where the second signaling received by the terminal device does not include indication information of the first information associated with the second signal. The terminal device may receive the second signal based on the first indication information and the second signaling. Because the second signaling no longer carries the first indication information of the first information associated with the second signal, overhead of the indication information carried in the second signaling can be reduced, and communication efficiency is improved.

The following explains and describes some nouns or terms used herein.

1. Network Device

A "radio access network device" is an access device via which a terminal device accesses the mobile communication system in a wireless manner, and may be a base station, an evolved eNodeB, a transmission reception point (TRP), a next generation base station (next generation NodeB, gNB) in a 5G mobile communication system, abase station in a future mobile communication system, an access node in a Wi-Fi system, or the like; or may be a module or a unit implementing some functions of a base station, for example, may be a central unit (CU), or may be a distributed unit (DU), or may be a network device in a V2X technology as a roadside unit (road side unit, or RSU). The base station may be configured to perform mutual conversion between a received over-the-air frame and an Internet Protocol (IP), and serve as a router between the terminal device and a remaining part of the access network. The remaining part of the access network may include an IP network. The RSU may be a fixed infrastructure entity that supports a vehicle-to-everything (V2X) application, and may exchange a message with another entity that supports the V2X application. The access network device may further coordinate attribute management of an air interface. A specific technology and a specific device form that are used by the radio access network device are not limited in embodiments herein. In this application, the radio access network device is referred to as a network device for short. Unless otherwise specified, network devices are all radio access network devices.

2. Terminal Device

A terminal device may also be referred to as a terminal, user equipment (UE), a mobile station (MS), a mobile terminal (MT), or the like. The terminal device may be a mobile phone, a pad (Pad), a computer having a wireless receiving and transmitting function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments herein.

In embodiments, an apparatus configured to implement functions of the network device may be a network device, or may be an apparatus, for example, a chip system, capable of supporting the network device to implement the functions. The apparatus may be mounted in the network device. The technical solutions provided in embodiments herein are described by taking an example in which the apparatus configured to implement the functions of the network device is a network device.

The network device and the terminal device may be deployed on the land, including indoor, outdoor, handheld, or vehicle-mounted; may be deployed on the water surface; or may be deployed on a plane, a balloon, or a satellite in the air. Application scenarios of the network device and the terminal device are not limited in embodiments herein.

The network device and the terminal device may communicate with each other using licensed spectrum, or unlicensed spectrum, or may communicate with each other using both licensed spectrum and unlicensed spectrum. The network device and the terminal device may communicate with each other over spectrums below 6 gigahertz (GHz), may communicate with each other over spectrums above 6 GHz, or may communicate with each other over both spectrums below 6 GHz and spectrums above 6 GHz. Spectrum resources used between the network device and the terminal device are not limited in embodiments herein.

In embodiments herein, a time domain symbol may be an orthogonal frequency division multiplexing (OFDM) symbol, or may be a single carrier-frequency division multiplexing (SC-FDM) symbol. Unless otherwise specified, symbols in embodiments herein are all time domain symbols.

3. Time Unit

A "time unit" is a time domain unit configured for data transmission, and may include time domain units such as a radio frame, a subframe, a slot, a mini-slot, and a time domain symbol. In 5G new radio (NR), one radio frame may include 10 subframes. One subframe may include one or more slots. Specific quantities of slots included in one subframe are related to a subcarrier spacing.

A numerology may include a subcarrier spacing, a cyclic prefix (CP) type, and/or the like. The CP type may also be referred to as a CP length, or referred to as a CP for short. The CP type may be an extended CP or a normal CP. A slot under an extended CP may include 12 (twelve) time domain symbols. A slot under a normal CP may include 14 (fourteen) time domain symbols. The time domain symbol may be referred to as a symbol for short. The time domain symbol may be an orthogonal frequency division multiplexing (OFDM) symbol, or may be a discrete fourier transform spread orthogonal frequency division multiplexing (DFT-s-OFDM) symbol. In embodiments herein, an example in which the time domain symbol is an OFDM symbol is used as an example to describe the embodiments.

As shown in Table 1, in an NR system, 5 types of numerologies may be supported, which are numbered 0 to 4. For example, a numerology numbered 2 corresponds to a subcarrier spacing of 60 kHz. A CP is a normal CP or an extended CP.

TABLE 1

| Supported numerologies (numerologies) | | |
|---|---|---|
| $\mu$ | Subcarrier spacing $\Delta f = 2^{\mu} \cdot 15$ [kHz] | Cyclic prefix |
| 0 | 15 | normal |
| 1 | 30 | normal |
| 2 | 60 | normal, extended |
| 3 | 120 | normal |
| 4 | 240 | normal |

For different subcarrier spacings, slot durations are different. For example, for the subcarrier spacing of 15 kHz, a duration of a slot is 1 millisecond (millisecond, ms); or for the subcarrier spacing of 30 kHz, a duration of a slot is 0.5 ms. A mini-slot, also referred to as a micro-slot, may be a smaller unit than a slot. One mini-slot may include one or more symbols. For example, one mini-slot may include 2 symbols, 4 symbols, 7 symbols, or the like. One slot may include one or more mini-slots.

Figure 4:
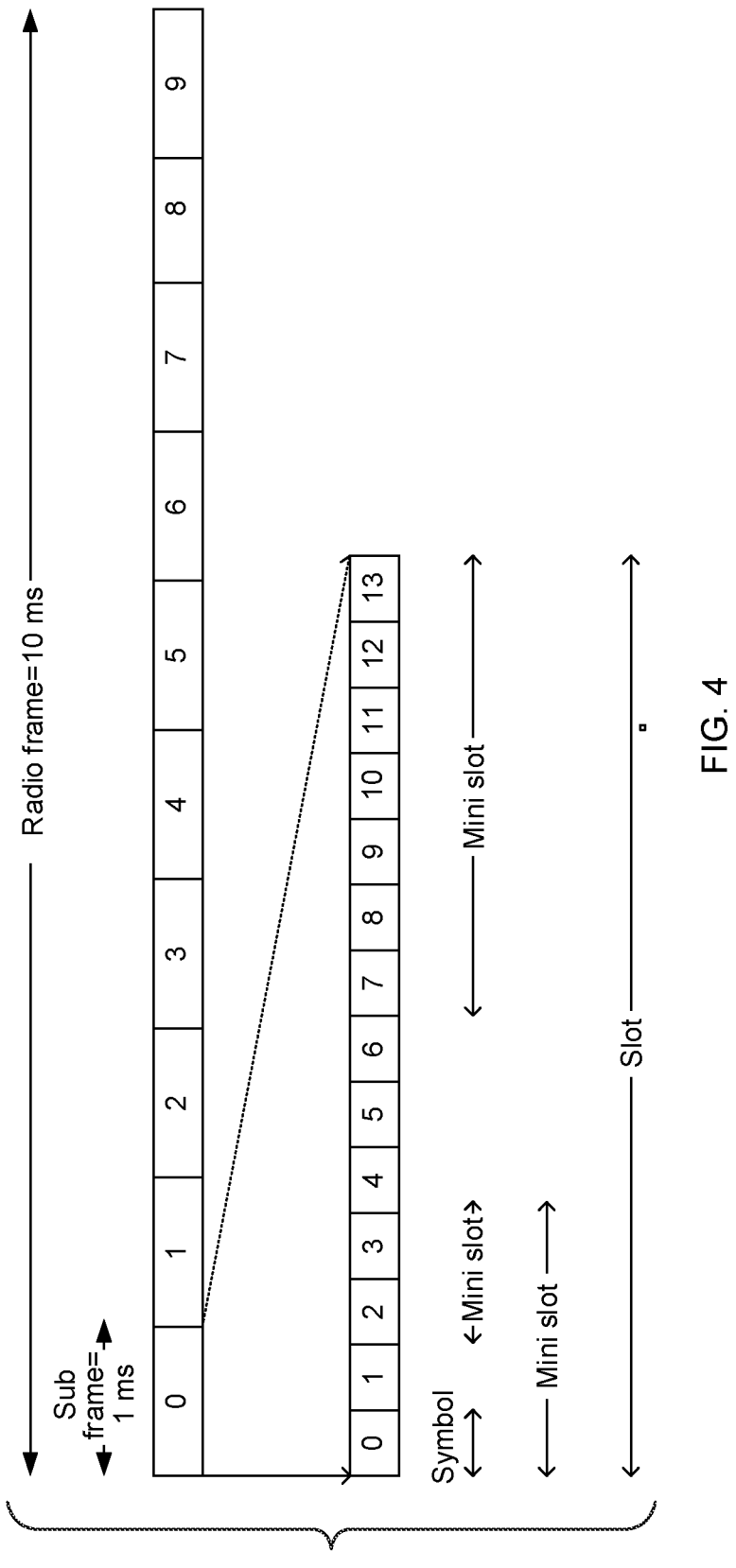
FIG. 4 is a schematic diagram of a correspondence between subframes, symbols, slots, and mini-slots according to an embodiment.

As shown in FIG. 4, in the example of 15 kHz subcarrier spacing, a duration of one radio frame is 10 ms, a duration of each subframe is 1 ms, one radio frame includes 10 subframes, a duration of each slot is 1 ms, each subframe may include one slot, and each slot may include 14 symbols. Further, a mini-slot may include 4 symbols, 2 symbols, 7 symbols, or the like.

4. Frequency Domain Unit

A frequency domain unit may include one or more resource blocks (RBs), resource elements (REs), resource block groups (s RBGs), or resource element groups (REGs). For example, the RBG may include one or more RBs, for example, 6 RBs; the RB may include one or more REs, for example, 12 REs; and the REG may include one time domain symbol in the time domain, and may include one RB in the frequency domain.

5. Antenna Port

An "antenna port" is a logical port configured for transmission. One antenna port includes multiple physical antennas. From the perspective of the terminal device, each antenna port corresponds to an independent radio channel.

6. Demodulation Reference Signal

A "demodulation reference signal" (DMRS) is a reference signal configured to recover a received signal. In example embodiments, the DMRS is a signal known to the terminal device. The terminal device may determine a fading characteristic of a radio channel, that is, a channel coefficient of the radio channel, based on the received signal and the DMRS signal. The channel coefficient is used to recover the received signal. In a 5G NR system, considering that channel coefficients from different antenna ports to the terminal device are different, in order to enable the terminal device to obtain information transmitted at a plurality of spatial layers, channel coefficients between each antenna port and the terminal device are estimated. Therefore, a different DMRS is configured for each antenna port. The DMRSs corresponding to different antenna ports may be multiplexed in a mode such as time division, frequency division, and code division. Currently, the 5G NR system supports a maximum of 12 DMRS ports.

In embodiments herein, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B each may be singular or plural. The character "/" generally indicates an "or" relationship between the associated objects. In formulas in this specification, the character "/" indicates a "division" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments are for distinguishing between a plurality of objects, but are not intended to limit an order, a time sequence, priorities, or importance of the plurality of objects. For example, first information and second information are merely intended to distinguish between different signaling, but do not indicate that the two types of information are different in content, priorities, a sending sequence, importance, or the like.

Figure 5:
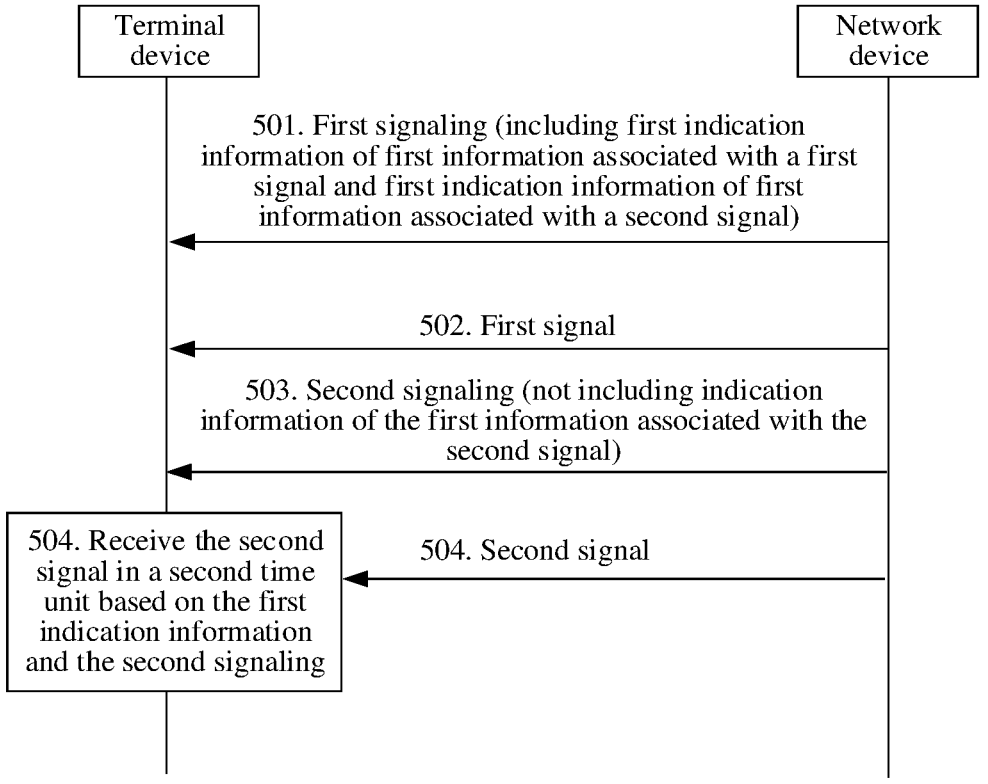
FIG. 5 is a schematic diagram of a possible communication method according to an embodiment.

The foregoing describes some concepts included in embodiments herein. Embodiments are described as following. FIG. 5 is a schematic diagram of a possible communication method according to an embodiment. The method may be executed by a terminal device and a network device, or may be executed by a chip in the terminal device and a chip in the network device. The network device in FIG. 5 may be the foregoing access network device 120 in FIG. 1. The terminal device may be the foregoing terminal device 110 in FIG. 1. The method shown in FIG. 5 may include the following operations.

501: The network device sends first signaling to the terminal device. Correspondingly, the terminal device receives the first signaling.

The first signaling indicates the terminal device to receive a first signal in a first time unit. The first signaling includes first indication information of first information associated with the first signal and first indication information of first information associated with a second signal. For example, if the first information is frequency domain resource information, the first signaling includes first indication information of frequency domain resource information associated with the first signal, and includes first indication information of frequency domain resource information associated with the second signal.

As shown in FIG. 5A, before step 501, the method may further include: The network device determines that the first information associated with the first signal is the same as the first information associated with the second signal.

502: The network device sends the first signal in the first time unit. Correspondingly, the terminal device receives the first signal in the first time unit based on the first signaling.

503: The network device sends second signaling to the terminal device. Correspondingly, the terminal device receives the second signaling.

The second signaling indicates the terminal device to receive the second signal in a second time unit. The second signaling does not include indication information of first information associated with the second signal.

The first indication information of the first information in step 501 is associated with the second signal, however, in step 503, the second signaling does not include any indication information of the first information associated with the second signal. In other words, in step 501, the first signal and the second signal are associated with same first indication information. The indication information in step 503 is any indication information of the first information associated with the second signaling. The indication information of the first information is generally referred to indication information indicating the first information associated with the second signaling in functions. The first indication information of the first information in step 501 is specific, that is, specific indication information included in the first signaling.

504: The network device sends the second signal to the terminal device in the second time unit. Correspondingly, the terminal device receives the second signal in the second time unit based on the first indication information and the second signaling.

An implementation of step 504 is as follows: The terminal device determines, based on the indication information of the first information, the first information associated with the second signal, and receives the second signal in the second time unit based on the first information and the second signaling.

In an example, the first information includes at least one of the following: frequency domain resource information, modulation and coding scheme information, antenna port information, bandwidth information, DMRS sequence initialization information, a transmit power control command of a scheduled PUCCH, and/or a PUCCH resource index.

Before the terminal device receives the second signal in the second time unit based on the indication information of the first information and the second signaling in step 504, the terminal device may determine, in any one of the following manners, resources occupied by the second signal.

For example, the first information may be frequency domain resource information, modulation and coding scheme information, antenna port information, bandwidth information, DMRS sequence initialization information, a transmit power control command of a scheduled PUCCH, and/or a PUCCH resource index. For example, when the first information is the frequency domain resource information, the terminal device determines, based on indication information of the frequency domain resource, a frequency domain resource occupied by the second signal, so as to receive the second signal based on the frequency domain resource occupied by the second signal and the second signaling. When the first information is the antenna port information, the terminal device determines, based on indication information of the antenna port information, an antenna port corresponding to the second signal, so as to receive the second signal based on the antenna port corresponding to the second signal and the second signaling. When the first information is the modulation and coding scheme information, the terminal device determines, based on indication information of the modulation and coding information, modulation and coding information corresponding to the second signal, so as to receive the second signal based on the modulation and coding information corresponding to the second signal and the second signaling. When the first information is the bandwidth information, the terminal device determines, based on indication information of the bandwidth information, a bandwidth corresponding to the second signal, so as to receive the second signal based on the bandwidth information corresponding to the second signal and the second signaling. When the first information is the DMRS sequence initialization information, the terminal device determines, based on indication information of the DMRS sequence initialization information, a DMRS sequence corresponding to the second signal, so as to receive the second signal based on the DMRS sequence corresponding to the second signal and the second signaling.

For example, the first information may include two or more of the following: frequency domain resource information, modulation and coding scheme information, antenna port information, bandwidth information, DMRS sequence initialization information, a transmit power control command of a scheduled PUCCH, or a PUCCH resource index. For example, when the first information includes at least the frequency domain resource information and the antenna port information, the first indication information includes at least two pieces of sub indication information: first sub indication information and second sub indication information. The first sub indication information indicates the frequency domain resource information, and the second sub indication information indicates the antenna port information. The terminal device determines, based on the first sub indication information, a frequency domain resource occupied by the second signal, and determines, based on the second sub indication information, an antenna port corresponding to the second signal, so that the second signal is received based on the frequency domain resource occupied by the second signal, the antenna port, and the second signaling. When the first information includes at least the frequency domain resource information and the modulation and coding information, the first indication information includes at least two pieces of sub indication information: first sub indication information and second sub indication information. The first sub indication information indicates the frequency domain resource information, and the second sub indication information indicates the modulation and coding information. The terminal device determines, based on the first sub indication information, a frequency domain resource occupied by the second signal, and determines, based on the second sub indication information, the modulation and coding information corresponding to the second signal, so that the second signal is received based on the frequency domain resource occupied by the second signal, the modulation and coding information, and the second signaling. When the first information includes at least the frequency domain resource information, the antenna port information, and the modulation and coding information, the first indication information includes at least first sub indication information, second sub indication information, and third sub indication information. The first sub indication information indicates the frequency domain resource information, the second sub indication information indicates the antenna port information, and the third sub indication information indicates the modulation and coding information. The terminal device determines, based on the first sub indication information, a frequency domain resource occupied by the second signal, and determines, an antenna port corresponding to the second signal based on the second sub indication information, and determines, based on the third sub indication information, modulation and coding information corresponding to the second signal, so that the second signal is received based on the frequency domain resource occupied by the second signal, the corresponding antenna port, the corresponding modulation and coding information, and the second signaling.

It should be specifically noted that, the first information includes but is not limited to the foregoing example. The first information may include one, two, or more of the following: frequency domain resource information, modulation and coding scheme information, antenna port information, bandwidth information, DMRS sequence initialization information, a transmit power control command of a scheduled PUCCH, and/or a PUCCH resource index, or may include other resource information used to receive a signal. This is not limited in this application. In addition, the indication information included in the first indication information may be one or more of frequency domain resource information indication information, modulation and coding scheme information indication information, antenna port information indication information, bandwidth information indication information, DMRS sequence initialization information indication information, indication information of a transmit power control command of a scheduled PUCCH, and/or indication information of a PUCCH resource index. A name of the indication information included in the first indication information is not specifically limited in this application, so any corresponding resource information that can be indicated falls within the scope of the technology herein.

It should be noted that, the first signaling includes the first indication information of the first information associated with the first signal. The first signaling is not limited to include only the first indication information. That is, in addition to the first indication information, the first signaling may further include the second indication information. For example, the second indication information may include indication information indicating a HARQ process, or may include indication information indicating whether the first signal is newly transmitted, or may further include indication information indicating a time resource occupied by the first signal, or certainly may include other information. This is not limited herein.

In an example, both the first time unit and the second time unit include one or more slots, mini-slots, or symbols. The first time unit and the second time unit do not overlap in time. The first time unit and the second time unit are in a same uplink-downlink switching periodicity. Using the manner in which the first time unit and the second time unit are in a same uplink-downlink switching periodicity can ensure that phases of the first signal and the second signal are continuous, allowing the terminal device to use a demodulation reference signal corresponding to the first signal to receive the second signal, thereby improving receiving performance of the second signal.

For example, as shown in FIG. 6, one uplink-downlink switching periodicity includes 5 slots (slot 0, slot 1, slot 2, slot 3 and slot 4). Slots 0, 1, 2, and 3 are downlink slots or downlink-dominant slots (slots in which downlink symbols are greater than uplink symbols), and a slot 4 is an uplink slot. The first time unit is a slot 0, and the second time unit may be a slot 1, or may be a slot 2 or a slot 3.

In an example, the first time unit may include N1 first slots, and the second time unit may include N2 second slots, where N1 and N2 are positive integers. First signals carried in each of the N1 first slots are corresponding to a same HARQ process. The first signals carried in each of the N1 first slots are corresponding to different transmitting blocks. In this example, the first signaling includes indication information used to indicate the HARQ process of the first signal carried in the N1 first slots. The first signaling further includes indication information used to indicate whether a signal carried in each of the N1 first slots is newly transmitted, and to indicate a redundancy version index. Similarly, the second signaling includes indication information used to indicate the HARQ process of the second signal carried in the N2 second slots. The second signaling may further include indication information used to indicate whether a signal carried in each of the N2 second slots is newly transmitted, and indicate a redundancy version index.

For example, when N1=2, the first signaling includes indication information indicating the HARQ process of the first signal carried in 2 first slots. A value of the indication information may be any value from 0 to M, where M is a positive integer. The first signaling includes two pieces of indication information A1 and A2. The A1 and A2 are respectively used to indicate whether a signal carried in 2 first slots is newly transmitted. The A1 indicates whether a signal carried in one of the 2 first slots is newly transmitted. The A2 indicates whether a signal carried in the other of the 2 first slots is newly transmitted. The first signaling may further include two pieces of indication information B1 and B2. The B1 and B2 are respectively used to indicate indication information of the redundancy version index corresponding to signals carried in two first slots. The B1 indicates a redundancy version index corresponding to a signal carried in one of the 2 first slots. The B2 indicates a redundancy version index corresponding to a signal carried in the other of the two first slots, where a value of the redundancy version index may be any value in 0 to K, where K is a positive integer.

In addition, a value of N2 may be equal to or unequal to N1, or may be greater than or less than N1. This is not limited in this embodiment.

In an example, the first signaling and the second signaling in this application may be control signaling, for example, may be physical layer control signaling, media access control (MAC) layer control signaling, or radio resource control (RRC) layer control signaling. To better understand the technical solution herein, the following uses downlink control information DCI as an example for description. The DCI is carried on a physical downlink control channel PDCCH, and is sent by the network device to the terminal device. The first signaling is Normal-DCI, that is, DCI in the prior art. The second signaling is mini-DCI newly defined herein. In one embodiment, the mini-DCI does not include at least a frequency domain resource indication field and/or an antenna port indication field. In contrast, the Normal-DCI necessarily includes a frequency domain resource indication field and an antenna port indication field.

To better understand the technical solution herein, the following describes newly defined mini-DCI with reference to a NR protocol. For example, a format of the mini-DCI may be 1_1, and the mini-DCI may include one or more of the following fields:

a bandwidth indication field, used to indicate a bandwidth index of a PDSCH;

a frequency domain resource indication field, used to indicate a frequency domain resource position occupied by the PDSCH;

a modulation and coding scheme field, used to indicate a modulation scheme and a code rate of the PDSCH;

an antenna port field, used to indicate an index of an antenna port corresponding to a PDSCH; and/or an initial value of a demodulation reference signal sequence field, used to indicate an initial value of a sequence in a demodulation reference signal corresponding to a PDSCH.

Further, the mini-DCI may not include (i.e., it may omit) one or more of the following fields (and thus sending the mini-DCI does not send one or more of the following fields and receiving the mini-DCI does not receive one or more of the following fields):

a PUCCH transmit power control command field, used to indicate the terminal device to adjust power of PUCCH transmission;

a PUCCH resource indicator field, used to indicate the terminal device to send a PUCCH resource; and/or a sounding reference signal (Sounding Reference Signal, SRS) request field, used to indicate the terminal device to send an SRS.

In an example, both the first signal and the second signal in this application may be PDSCHs. The first PDSCH is scheduled by the Normal-DCI. The second PDSCH is scheduled by the mini-DCI. Because the Normal-DCI includes indication information of all related information of the first PDSCH, the terminal device may receive the first signal based on only the first signaling. The mini-DCI does not include (i.e., it omits and is devoid of in one embodiment) indication information of at least one of the following: the PUCCH transmit power control command, the PUCCH resource indication, and the SRS request. Therefore, the terminal device in such embodiment needs to determine, based on the indication information included in the Normal-DCI, information that is not explicitly indicated in the mini-DCI (for example, at least one of the PUCCH transmit power control command, the PUCCH resource indication, and the SRS request). The terminal device may determine an access resource of the second signal based on the indication information of the first information and other information included in the second signaling, thereby using the access resource to receive the second signal.

For example, taking the mini-DCI not including the frequency domain resource indication information and the antenna port indication information as an example, the terminal device separately determines, based on the frequency domain resource indication information and the antenna port indication information in the first signaling, a frequency domain resource occupied by the second signal and an antenna port number corresponding thereto, and determines, based on the indication information in the second signaling, other information of the second signal, such as an occupied time domain resource, thereby receiving the second signal.

It should be noted that, in this embodiment, the first signal and the second signal may correspond to a same process, or may correspond to different processes.

For a terminal device with a slowly-varying channel, when the terminal device needs to receive a PDSCH in a plurality of consecutive slots, the network device sends DCI to the terminal in each slot, to schedule the PDSCH. In addition, the DCI in each slot carries a frequency domain resource indication field and an antenna port indication field to indicate same content, thereby increasing unnecessary signaling overhead. According to the technical solutions oherein, the first signaling includes the first indication information of the first information associated with the first signal and the first indication information of the first information associated with the second signal. The second signaling does not include the indication information of the first information associated with the second signal. In this way, overhead of the indication information carried in the second signaling is reduced, and communication efficiency is improved. Further, for a terminal device with a slowly-varying channel, channel quality of the network device and the terminal device remains almost unchanged in a plurality of consecutive slots. In this way, the network device sends a signal to the terminal device in the plurality of consecutive slots using one or more of the following: a same frequency domain resource, a same modulation and coding scheme, a same antenna port, and/or a same bandwidth. In this way, there is no adverse impact on transmission performance, and therefore reduced overhead for sending the second signaling without reducing communication quality.

In the foregoing embodiments provided in this application, the methods provided in embodiments herein are separately described from the perspective of the network device, the terminal device, and interaction between the network device and the terminal device. To implement functions in the method according to the foregoing embodiments, the network device and the terminal device may include hardware structure and/or a software module, and implement the foregoing functions in a form of the hardware structure, the software module, or a combination of the hardware structure and the software module. Whether a function in the foregoing functions is performed by the hardware structure, the software module, or the combination of the hardware structure and the software module, depends on particular applications and design constraints of the technical solutions.

Figure 7:
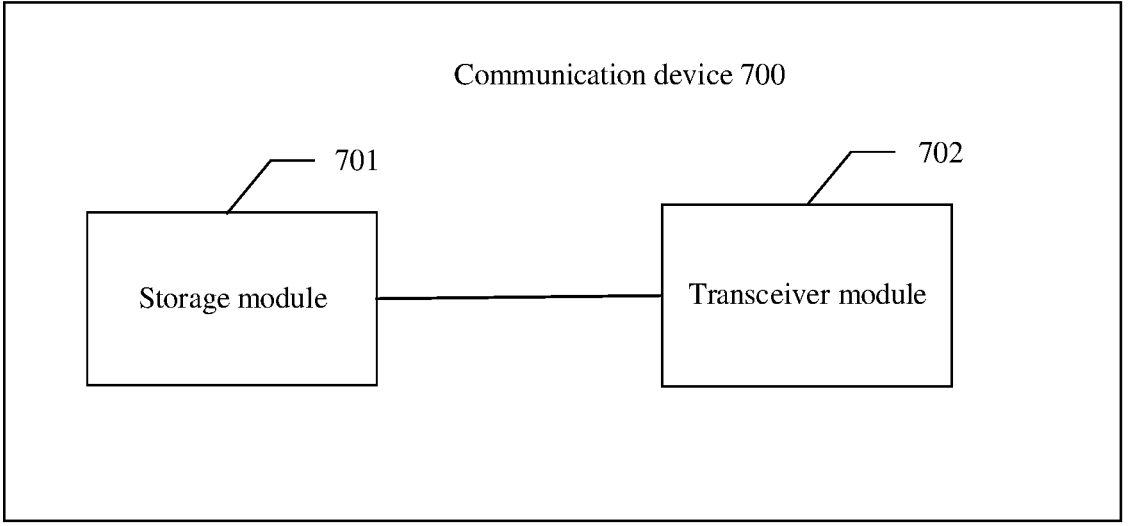
FIG. 7 is a schematic diagram of a communication apparatus 700 according to an embodiment.
Figure 8:
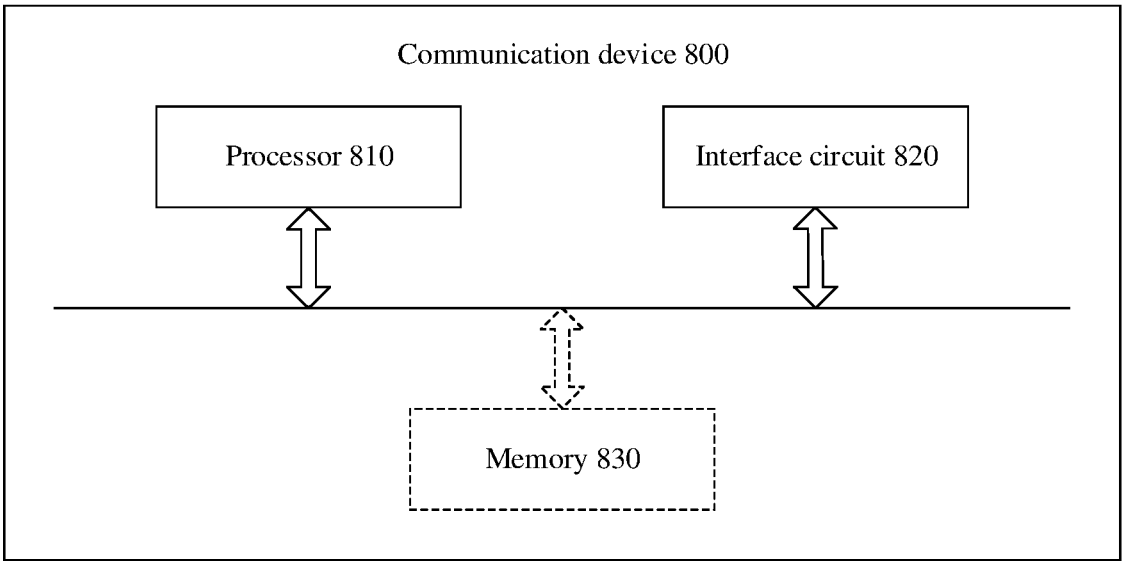
FIG. 8 is a schematic diagram of a communication apparatus 800 according to an embodiment.

FIG. 7 and FIG. 8 are schematic diagrams of structures of possible communication apparatuses according to embodiments herein. The communication apparatuses may implement the functions of the terminal device or the network device in the foregoing method embodiments. Therefore, the communication apparatuses may also implement advantageous effects of the foregoing method embodiments. In other embodiments herein, the communication apparatus may be the terminal device 110 shown in FIG. 1, or may be the access network device 120 shown in FIG. 1, or may be a module (for example, a chip) used in a terminal device or an access network device.

As shown in FIG. 7, a communication apparatus 700 includes a storage module 701 and a transceiver module 702. The communication apparatus 700 may be configured to implement functions of the terminal device or the network device in the method embodiments shown in FIG. 5 or FIG. 5A.

When the communication apparatus 700 is configured to implement the functions of the terminal device in the method embodiments in FIG. 5 or FIG. 5A, the storage module 701 is configured to store a computer program or instructions. The transceiver module 702 is configured to receive first signaling, where the first signaling indicates the terminal device to receive a first signal in a first time unit, and includes first indication information of first information associated with the first signal and first indication information of first information associated with a second signal. The transceiver module 702 is configured to receive the first signal in the first time unit based on the first signaling. The transceiver module 702 is configured to receive second signaling, where the second signaling indicates the terminal device to receive the second signal in a second time unit, and does not include indication information of the first information associated with the second signal. The transceiver module 702 is further configured to receive the second signal in the second time unit based on the first indication information and the second signaling. Further, the communication apparatus may further include a processing module 703, configured to determine, based on the first indication information, the first information associated with the second signal. The transceiver module 702 is configured to receive the second signal in the second time unit based on the first information and the second signaling.

When the communication apparatus 700 is configured to implement the functions of the network device in the method embodiments in FIG. 5 or FIG. 5A, the storage module 701 is configured to store a computer program or instructions. The transceiver module 702 is configured to send first signaling to a terminal device, where the first signaling indicates the terminal device to receive a first signal in a first time unit, and includes first indication information of first information associated with the first signal and first indication information of first information associated with a second signal. The transceiver module 702 is configured to send the first signal in the first time unit, and configured to send second signaling to the terminal device, where the second signaling indicates the terminal device to receive a second signal in the second time unit, and does not include indication information of the first information associated with the second signal. The transceiver module 702 is further configured to send the second signal to the terminal device in the second time unit. Further, the communication apparatus further includes a processing module 703, configured to determine that the first information associated with the first signal is the same as the first information associated with the second signal.

For more detailed descriptions of the storage module 701, the transceiver module 702, and the processing module 703, reference may be made to relevant descriptions in the foregoing method embodiments. Details are not described herein again.

As shown in FIG. 8, a communication apparatus 800 includes a processor 810 and an interface circuit 820. The processor 810 and the interface circuit 820 are coupled to each other. The interface circuit 820 may be a transceiver or an input/output interface. Optionally, the communication apparatus 800 may further include a memory 830, configured to store instructions executed by the processor 810, or store input data required by the processor 810 to run instructions, or store data generated after the processor 810 runs instructions.

When the communication apparatus is a chip used in a terminal device, the chip in the terminal device implements functions of the terminal device in the foregoing method embodiments. The chip in the terminal device receives information from another module (for example, a radio frequency module or an antenna) in the terminal device. The information is sent by a network device to the terminal device. Alternatively, the chip in the terminal device sends information to another module (for example, a radio frequency module or an antenna) in the terminal device. The information is sent by the terminal device to a network device.

When the communication apparatus is a chip used in a network device, the chip in the network device implements functions of the network device in the foregoing method embodiments. The chip in the network device receives information from another module (for example, a radio frequency module or an antenna) in the network device. The information is sent by a terminal device to the network device. Alternatively, the chip in the network device sends information to another module (for example, a radio frequency module or an antenna) in the network device. The information is sent by the network device to a terminal device.

It may be understood that, the processor in embodiments herein may be a central processing unit (CPU), or may be another general purpose processor, a digital signal processor (DSP), an application specific integrated circuit (ASIC), a field programmable gate array (FPGA) or another programmable logic devices, a transistor logic device, hardware component, or any combination thereof. The general purpose processor may be a microprocessor or any regular processor, or the like.

The method steps in embodiments herein may be implemented in or by hardware, or may be implemented in a manner of executing software instructions by a processor. The software instructions may include a corresponding software module. The software module may be stored in a random access memory (RAM), a flash memory, a read-only memory (ROM), a programmable read-only memory (PROM), an erasable programmable read-only memory (erasable PROM, or EPROM), an electrically erasable programmable read-only memory (electrically EPROM, or EEPROM), a register, a hard disk, a removable hard disk, a CD-ROM, or any other form of storage medium well-known in the art. For example, a storage medium is coupled to a processor, so that the processor can read information from the storage medium and write information into the storage medium. The storage medium may be a component of the processor. The processor and the storage medium may be located in an ASIC. In addition, the ASIC may be located in an access network device or a terminal device. Certainly, the processor and the storage medium may exist in the access network device or the terminal device as discrete components.

All or some of the foregoing embodiments may be implemented by software, hardware, firmware, or any combination thereof. When software is configured to implement the embodiments, all or a part of the embodiments may be implemented in a form of a computer program product. The computer program product includes one or more computer programs and instructions. When the computer programs or instructions are loaded and executed on a computer, all or some of the procedures or functions in embodiments herein are executed. The computer may be a general purpose computer, a dedicated computer, a computer network, or other programmable apparatuses. The computer programs or the instructions may be stored in a computer readable storage medium, or may be transmitted through the computer readable storage medium. The computer readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid state disk (SSD).

In embodiments herein, unless otherwise stated or there is a logic conflict, terms and/or descriptions between different embodiments are consistent and may be mutually referenced, and technical features in different embodiments may be combined based on an internal logical relationship thereof, to form a new embodiment.

Various numbers in embodiments are merely used for differentiation for ease of description, and are not used to limit the scope of embodiments herein. The sequence numbers of the foregoing processes do not mean execution sequences, and the execution sequences of the processes should be determined based on functions and internal logic of the processes.

What is claimed is:

1. A communication method, comprising:
receiving first signaling, wherein the first signaling indicates a terminal device to receive a first signal in a first time unit, and the first signaling comprises first indication information of first information associated with the first signal and first indication information of first information associated with a second signal;
receiving the first signal in the first time unit based on the first signaling;
receiving second signaling, wherein the second signaling indicates the terminal device to receive the second signal in a second time unit, and receiving the second signaling does not comprise receiving indication information of the first information associated with the second signal; and
receiving the second signal in the second time unit based on the first indication information and the second signaling, wherein the first time unit and the second time unit do not overlap in time,
wherein the receiving the second signal in the second time unit based on the first indication information and the second signaling comprises:
determining the first information associated with the second signal based on the first indication information; and
receiving the second signal in the second time unit based on the first information and the second signaling.

2. The method according to claim 1, wherein the first information comprises at least one of the following: frequency domain resource information, modulation and coding scheme information, antenna port information, and/or bandwidth information.

3. The method according to claim 1, wherein the indication information of the first information comprises frequency domain resource indication information and antenna port indication information; and the determining the first information associated with the second signal based on the first indication information, and receiving the second signal in the second time unit based on the first information and the second signaling comprise:
separately determining a frequency domain resource occupied by the second signal and an antenna port number corresponding to the frequency domain resource based on the frequency domain resource indication information and the antenna port indication information; and
receiving the second signal in the second time unit based on the frequency domain resource occupied by the second signal, the antenna port number corresponding to the frequency domain resource, and the second signaling.

4. The method according to claim 1, wherein the first time unit and the second time unit are each a slot.

5. The method according to claim 1, wherein the first time unit and the second time unit correspond to a same uplink-downlink switching periodicity.

6. A communication method, comprising:
sending first signaling to a terminal device, wherein the first signaling indicates the terminal device to receive a first signal in a first time unit, and the first signaling comprises first indication information of first information associated with the first signal and first indication information of first information associated with a second signal, wherein the first information comprises at least one of the following: modulation and coding scheme information, antenna port information, and/or bandwidth information;
sending the first signal in the first time unit;
sending second signaling to the terminal device, wherein the second signaling indicates the terminal device to receive the second signal in a second time unit, and sending the second signaling does not comprise sending indication information of first information associated with the second signal; and
sending the second signal to the terminal device in the second time unit, wherein the first time unit and the second time unit do not overlap in time.

7. The method according to claim 6, wherein before sending the first signaling to the terminal device, the method further comprises:
determining that the first information associated with the first signal is the same as the first information associated with the second signal.

8. The method according to claim 6, wherein the first information further comprises frequency domain resource information.

9. The method according to claim 6, wherein the first time unit and the second time unit are each a slot.

10. The method according to claim 6, wherein the first time unit and the second time unit are corresponding to a same uplink-downlink switching periodicity.

11. A communication apparatus, comprising:
a processor; and
a non-transitory computer-readable medium including instructions that, when executed by the processor, facilitate carrying out a method comprising:
receiving first signaling, wherein the first signaling indicates to receive a first signal in a first time unit, and the first signaling comprises first indication information of first information associated with the first signal and first indication information of first information associated with a second signal;
receiving the first signal in the first time unit based on the first signaling;

receiving second signaling, wherein the second signaling indicates to receive a second signal in a second time unit, and receiving the second signaling does not comprise receiving indication information of the first information associated with the second signal; and receiving the second signal in the second time unit based on the first indication information and the second signaling, wherein the first time unit and the second time unit do not overlap in time, wherein the receiving the second signal in the second time unit based on the first indication information and the second signaling comprises:

determining the first information associated with the second signal based on the first indication information; and receiving the second signal in the second time unit based on the first information and the second signaling.

12. The apparatus according to claim 11, wherein the first information comprises at least one of the following: frequency domain resource information, modulation and coding scheme information, antenna port information, and/or bandwidth information.

13. The apparatus according to claim 11, wherein the processor is further configured to determine, based on the first indication information, the first information associated with the second signal, and receive the second signal in the second time unit based on the first information and the second signaling.

14. The apparatus according to claim 11, wherein the first time unit and the second time unit are each a slot.

15. The apparatus according to claim 11, wherein the first time unit and the second time unit are corresponding to a same uplink-downlink switching periodicity.

16. For use in a communication apparatus comprising: a processor:

a non-transitory computer-readable medium including instructions that, when executed by the processor, facilitate carrying out operations comprising:

send first signaling to a terminal device, wherein the first signaling indicates the terminal device to receive a first signal in a first time unit, and the first signaling comprises first indication information of first information associated with the first signal and first indication information of first information associated with a second signal, where the first information includes at least one of the following: modulation and coding scheme information, antenna port information, and bandwidth information;

send the first signal in the first time unit;

send second signaling to the terminal device, wherein the second signaling indicates the terminal device to receive a second signal in a second time unit, and the second signaling does not indicate indication information of first information associated with the second signal; and send the second signal to the terminal device in the second time unit, wherein the first time unit and the second time unit do not overlap in time.

17. The apparatus according to claim 16, wherein the processor further configured to determine that the first information associated with the first signal is the same as the first information associated with the second signal.

18. The apparatus according to claim 16, wherein the first information further comprises frequency domain resource information.

19. The apparatus according to claim 16, wherein the first time unit and the second time unit are each a slot.

* * * * *